(12) United States Patent
Minster

(10) Patent No.: US 10,328,934 B2
(45) Date of Patent: Jun. 25, 2019

(54) TEMPORAL DATA ASSOCIATIONS FOR OPERATING AUTONOMOUS VEHICLES

(71) Applicant: GM GLOBAL TECHNOLOGY OPERATIONS LLC, Detroit, MI (US)

(72) Inventor: Gautier Minster, San Francisco, CA (US)

(73) Assignee: GM GLOBAL TECHNOLOGY OPERATIONS LLC, Detroit ( * ) Notice: Subject to any disclaimer, the term of this patent is extended or adjusted under 35 U.S.C. 154(b) by 129 days.

(21) Appl. No.: 15/463,978

(22) Filed: Mar. 20, 2017

(65) Prior Publication Data

US 2017/0242442 A1    Aug. 24, 2017

(51) Int. Cl.
| | |
|---|---|
| *B60W 10/04* | (2006.01) |
| *B60W 30/09* | (2012.01) |
| *G05D 1/02* | (2006.01) |
| *G06T 7/00* | (2017.01) |
| *G06T 7/32* | (2017.01) |
| *G06T 7/38* | (2017.01) |
| *B60W 40/04* | (2006.01) |
| *G06K 9/00* | (2006.01) |
| *G01S 19/13* | (2010.01) |

(52) U.S. Cl.
CPC ............ *B60W 30/09* (2013.01); *B60W 40/04* (2013.01); *G05D 1/0248* (2013.01); *G06K 9/00791* (2013.01); *G06T 7/00* (2013.01); *G06T 7/32* (2017.01); *G06T 7/38* (2017.01); *B60W 2420/42* (2013.01); *B60W 2420/52* (2013.01); *G01S 19/13* (2013.01); *G05D 2201/0213* (2013.01); *G06T 2207/10016* (2013.01); *G06T 2207/10024* (2013.01); *G06T 2207/10028* (2013.01); *G06T 2207/20084* (2013.01); *G06T 2207/30261* (2013.01)

(58) Field of Classification Search
CPC ...... B60W 30/09; B60W 10/04; B60W 10/20; G06T 7/32; G06T 7/00; G05D 1/0248
USPC .............................................. 701/22, 25, 26
See application file for complete search history.

(56) References Cited

U.S. PATENT DOCUMENTS

| | | | |
|---|---|---|---|
| 2015/0177007 A1* | 6/2015 | Su .......................... | G01C 21/34 701/25 |
| 2015/0244826 A1* | 8/2015 | Stenneth .................. | H04Q 9/00 709/213 |
| 2015/0301338 A1* | 10/2015 | Van Heugten ........... | G02C 7/04 345/8 |
| 2017/0137023 A1* | 5/2017 | Anderson .......... | B60G 17/0195 |
| 2017/0212515 A1* | 7/2017 | Bertollini ................ | B60Q 9/00 |

(Continued)

*Primary Examiner* — Thomas G Black
*Assistant Examiner* — Wae L Louie
(74) *Attorney, Agent, or Firm* — Lorenz & Kopf LLP

(57) ABSTRACT

Systems and method are provided for controlling a vehicle. In one embodiment, a method includes: selecting, by a controller onboard the vehicle, first data for a region from a first device onboard the vehicle based on a relationship between a time associated with the first data and a frequency associated with a second device, obtaining, by the controller, second data from the second device, the second data corresponding to the region, correlating, by the controller, the first data and the second data, and determining, by the controller, a command for operating one or more actuators onboard the vehicle in a manner that is influenced by the correlation between the first data and the second data.

17 Claims, 6 Drawing Sheets

(56) References Cited

U.S. PATENT DOCUMENTS

2017/0242442 A1\* 8/2017 Minster ................ G05D 1/0248
2018/0057004 A1\* 3/2018 Muldoon .............. B60W 10/06

\* cited by examiner

TEMPORAL DATA ASSOCIATIONS FOR OPERATING AUTONOMOUS VEHICLES

TECHNICAL FIELD

The present disclosure generally relates to autonomous vehicles, and more particularly relates to systems and methods for temporally associating data when analyzing the environment around an autonomous vehicle.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

To achieve high level automation, vehicles are often equipped with increasing number of different types of devices for analyzing the environment around the vehicle, such as, for example, cameras or other imaging devices, radar or other detection devices, surveying devices, and the like. In practice, the different onboard devices typically operate at different sampling rates or refresh rates, and as a result, capture different types of data corresponding to different points in time. Accordingly, it is desirable to provide systems and methods for synchronizing data sets from different points in time to improve correlations between different types of data. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: selecting, by a controller onboard the vehicle, first data for a region from a first device onboard the vehicle based on a relationship between a time associated with the first data and a frequency associated with a second device, obtaining, by the controller, second data from the second device, the second data corresponding to the region, correlating, by the controller, the first data and the second data, and determining, by the controller, a command for operating one or more actuators onboard the vehicle in a manner that is influenced by the correlation between the first data and the second data.

In another embodiment, an autonomous vehicle is provided, which includes: a first device onboard the vehicle providing first data at a first frequency, a second device onboard the vehicle providing second data at a second frequency different from the first frequency, one or more actuators onboard the vehicle, and a controller that, by a processor, selects a subset of the first data based on a relationship between a time associated with the subset and the second frequency associated with the second device, correlates the subset with a second subset of the second data, and autonomously operates the one or more actuators onboard the vehicle in a manner that is influenced by the correlation between the subset and the second subset.

In another embodiment, a method of controlling a vehicle includes: obtaining, by a control module onboard the vehicle, a plurality of images from a camera onboard the vehicle, the camera capturing the plurality of images of a field of view at a first frequency, obtaining, by the control module, ranging data from a ranging device onboard the vehicle, the ranging device scanning an environment around the vehicle at a second frequency different from the first frequency, correlating, by the control module, a first image of the plurality of images with a subset of the ranging data corresponding to the field of view based on a relationship between a timestamp associated with the first image and the second frequency, determining, by the control module, a command for operating one or more actuators onboard the vehicle in a manner that is influenced by the correlation between the first image and the subset of the ranging data, autonomously operating, by the control module, the one or more actuators in accordance with the command.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
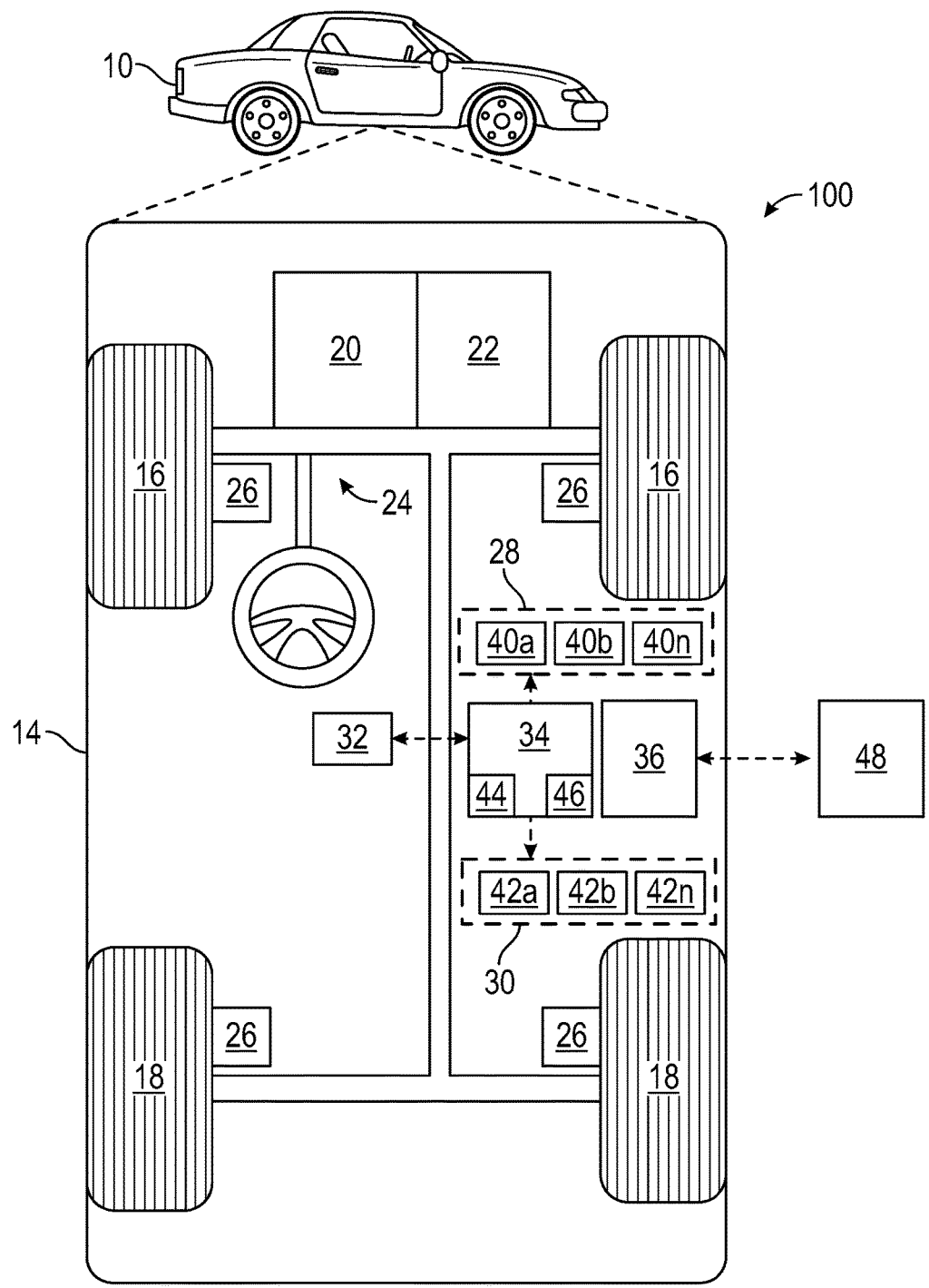
FIG. 1 is a functional block diagram illustrating an autonomous vehicle having a ride control system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In one or more exemplary embodiments described herein, a vehicle capable of autonomous operation includes a number of different devices that capture images or otherwise generate data representative of a scene or environment in a vicinity of the vehicle from different perspectives and with different sampling or refresh rates. Image data from one onboard imaging device may be correlated with data from another device onboard the vehicle based on the relationship between a time (or timestamp) associated with the image data and the instance in time during which the fields of view or lines of sight associated with the respective devices are aligned. In this regard, a temporal association may be established between data sets from the different devices, and then correlations between temporally associated data sets are utilized to assign depths or other attributes to the data sets, detect objects, or perform other actions with respect to one data set using the correlated data set. The augmented or enhanced data set may then be analyzed and utilized to determine commands for autonomously operating one or more actuators onboard the vehicle. In this manner, autonomous operation of the vehicle is influenced by the correlation between temporally associated data sets.

In one embodiment, a controller onboard a vehicle selects an image (or imaging data) of a region from first imaging device (or camera) onboard the vehicle based on a relationship between a time associated with the image and a frequency associated with a ranging device scanning the environment around the vehicle. The controller also selects or obtains a subset of ranging data from the ranging device that corresponds to the instance in time at which the ranging device was scanning at least a portion of the imaged region, and then correlates or otherwise associates the ranging data at or around that instance in time with the selected image. In this regard, the controller may assign depths or other dimensional characteristics to the image using the subset of ranging data, or alternatively, identify or detect object regions of ranging data within the subset corresponding to an object identified within the image. Commands for autonomously operating the vehicle are then influenced by the correlation between data sets. For example, the depths assigned to an image may be utilized to ascertain a distance between the vehicle and an object, which, in turn, may influence commands controlling the lateral or longitudinal movement of the vehicle along a route to adhere to safety buffers or minimum distances between the vehicle and the object. Alternatively, a neural network or other classification algorithm may be applied to an object region identified within ranging data to classify the object region as corresponding to an object of a particular object type, which, in turn, may influence the autonomous operation of the vehicle relative to the object based on its associated type.

For example, as described in greater detail below in the context of FIGS. 4-7, exemplary embodiments of a vehicle include a plurality of cameras and one or more ranging devices, such as a light detection and ranging (lidar) device. The cameras are distributed and positioned at different locations about the vehicle to capture different portions of the environment around the vehicle with the particular field of view and perspective of each respective camera. The lidar device periodically scans the environment around the vehicle and obtains corresponding point cloud datasets. In exemplary embodiments, a lidar device scans a full revolution (e.g., 360°) about the vehicle with a particular angular frequency, which may be different from and/or independent of the image frequency (or sampling frequency) at which the cameras capture images. To facilitate temporally associating and correlating images from a particular camera with lidar points, an optimal sampling time for the camera is calculated or otherwise determined based on when the line-of-sight of the lidar is aligned substantially parallel with the field of view of the camera (e.g., when the lidar line-of-sight is parallel to the bisector of the camera field of view). In this regard, based on the orientation of the camera field of view, the starting orientation for the lidar scan, the start time of the lidar scan (e.g., the instance in time when the lidar is at the starting orientation), and the angular frequency or rotational velocity of the lidar device, an optimal sampling time where the line-of-sight lidar device is aligned parallel with the camera field of view may be determined.

Once the optimal sampling time associated with a particular camera is determined, the image (or image data) captured by the camera at an instance in time closest to the optimal sampling time is identified or otherwise selected for correlating with the lidar point cloud data. For example, each image generated by the camera may have a timestamp associated therewith, with the selected image having the minimum difference between its associated timestamp and the optimal sampling time. Thus, the selected image is most closely associated with the lidar point cloud data obtained when the line-of-sight lidar device was aligned with the camera. Once an image that is temporally associated with the lidar point cloud data is selected, the subset of the lidar point cloud data corresponding to the camera's field of view may be correlated with the image data of the selected image by projecting the lidar point cloud data onto the image data, for example, by assigning depths to portions of the image data, classifying or recognizing portions of the image data as corresponding to an object detected by the lidar, or the like. In turn, the object detection, classification, and analysis based on the image data may be improved, which, in turn, also improves autonomous operation of the vehicle by virtue of the commands for operating the vehicle being influenced by the objects in the environment in the vicinity of the vehicle.

For example, when the lidar detects a moving car in front of the vehicle, projecting the three-dimensional lidar point cloud data for the car onto the two-dimensional image from a forward-looking camera that is temporally associated with the forward-looking lidar alignment, the lidar points corresponding to the car will better overlap the image data corresponding car in the image. By reducing discrepancies between pixels of image data and the projected lidar points, a more accurate bounding box of an object in the image can be determined, which, in turn, improves object classification when applying a neural network to the image data contained within the bounding box to determine what the object is (e.g., a car, a pedestrian, a traffic sign, etc.). Additionally or alternatively, given a region of image data where an object has been visually detected in an image temporally associated with lidar point cloud data, it can be determined which lidar points correspond to that detected object, and thereby, the determination of the object distance or how the lidar point cloud data should be segmented into different objects may be improved. The temporal association between lidar point cloud data and a selected image can also be utilized to resolve what the surface of the ground looks like in the image data based on the three-dimensional position and orientation of the vehicle (e.g., determined by the localization part of the stack as described below in the context of FIG. 3) and the fact that the lidar data and image data are temporally coherent.

With reference to FIG. 1, an autonomous vehicle control system shown generally at 100 is associated with a vehicle 10 in accordance with various embodiments. In general, the control system 100 determines a motion plan for autonomously operating the vehicle 10 along a route in a manner that accounts for objects or obstacles detected by onboard sensors 28, 40, as described in greater detail below. In this regard, data from different types of onboard sensors 28, 40 having different sampling frequencies or update frequencies associated therewith are temporally associated with one another to effectively synchronize the data sets prior to establishing correlations between data sets, as described in greater detail below primarily in the context of FIGS. 4-7. The temporal associations reduce discrepancies and improve accuracy or precision when correlating between data sets, which, in turn, improves object detection, object classification, and the like, and thereby improves autonomous operation of the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the ride control system 100 and, when executed by the processor 44, cause the processor 44 to calculate or otherwise determine sampling times for temporally associating data sets across sensing devices 40 and select or otherwise identify temporally associated data sets based on those sampling times, thereby effectively synchronizing the data obtained by different sensing devices 40. Thereafter, the processor 44 may establish correlations between the data sets and utilize the correlations to improve object detection, object classification, object prediction, and the like as described herein. The resulting objects and their classification and predicted behavior influences the travel plans for autonomously operating the vehicle 10, which, in turn, influences commands generated or otherwise provided by the processor 44 to control actuators 42. Thus, the temporal association and correlation between different data sets from different sensing devices 40 improves autonomous operation of the vehicle 10 by improving the object analysis as described herein.

Figure 2:
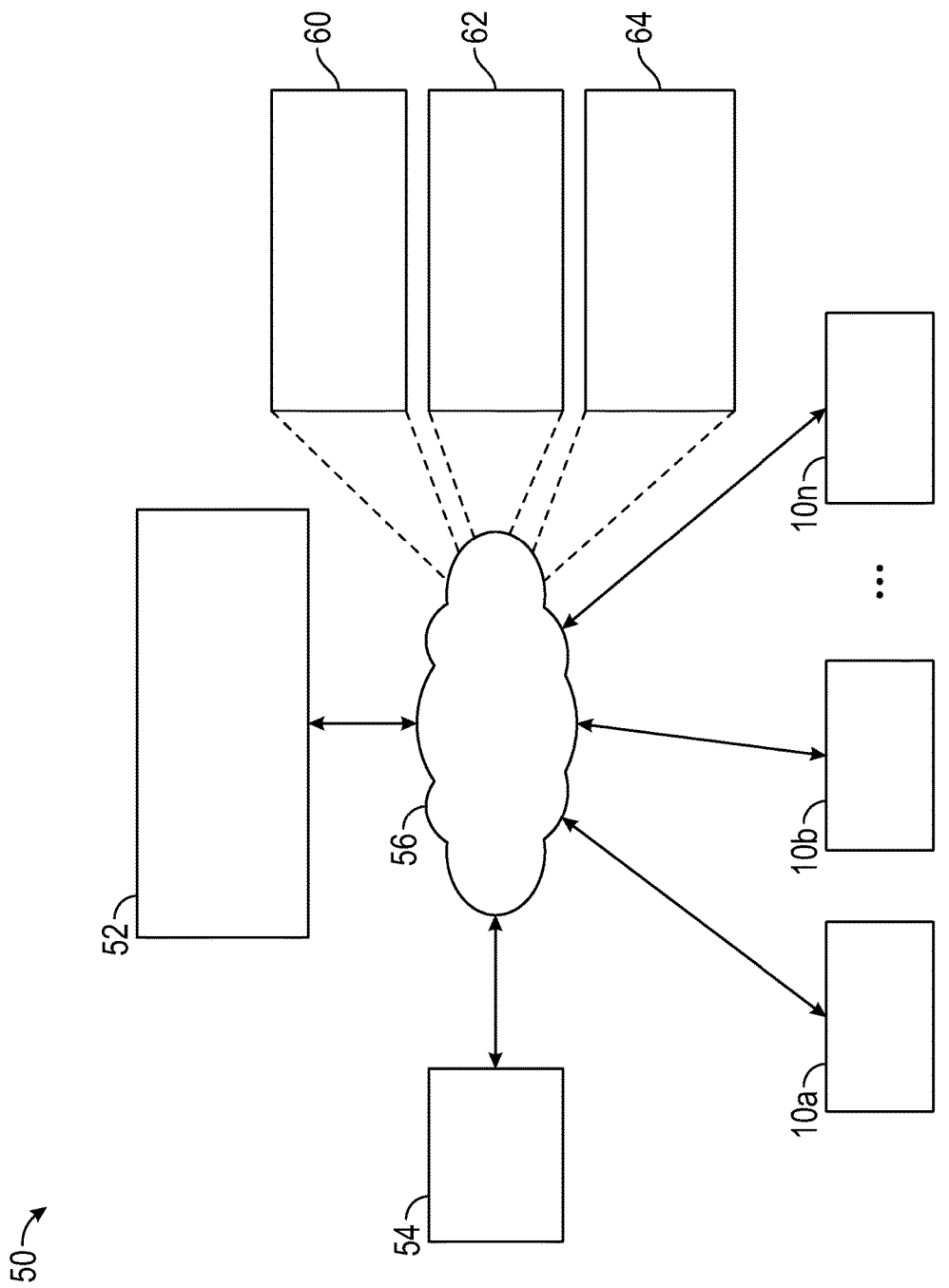
FIG. 2 is a functional block diagram illustrating a transportation system having one or more autonomous vehicles of FIG. 1, in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more instances of autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
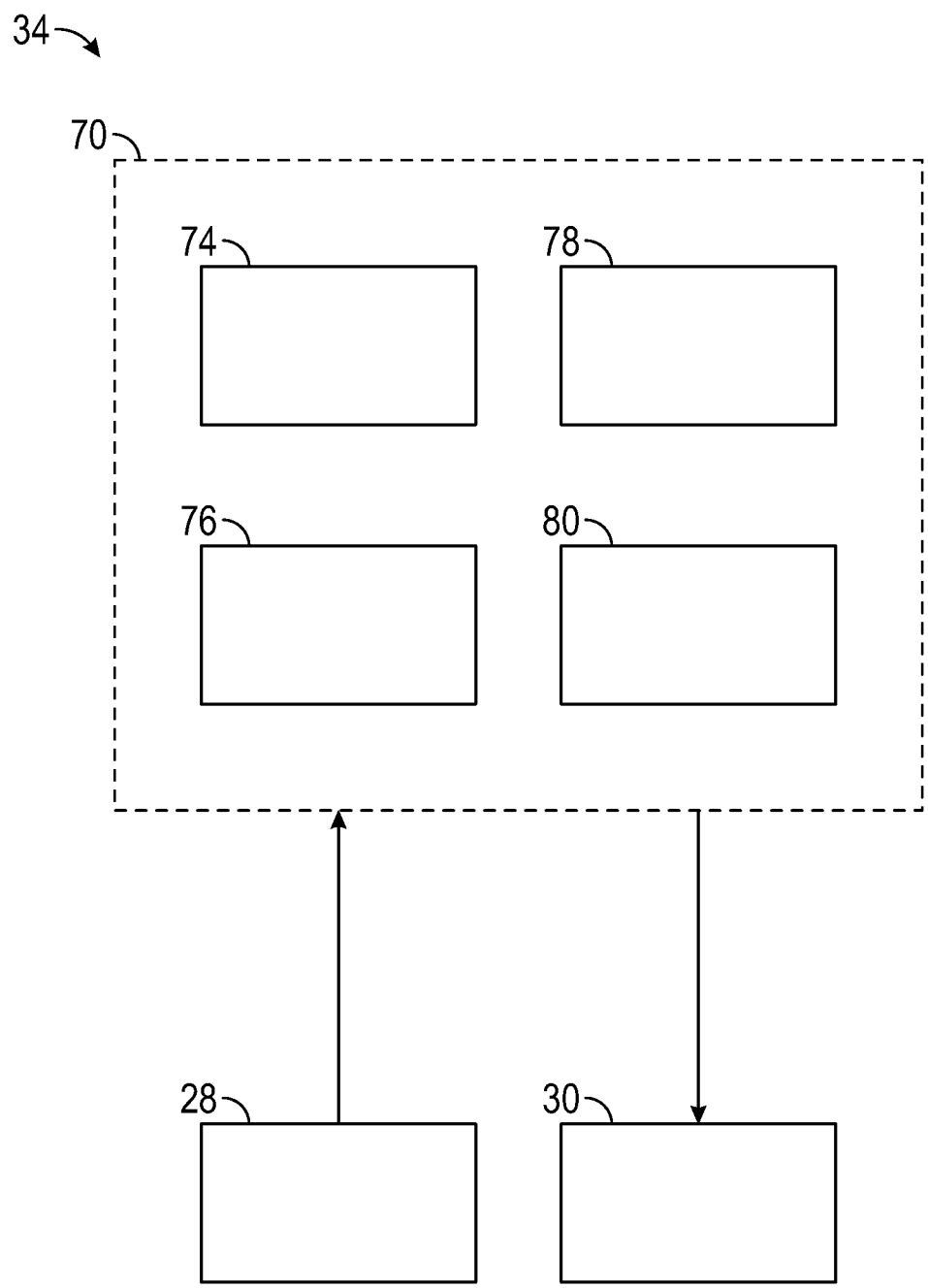
FIG. 3 is a schematic block diagram of an automated driving system (ADS) for a vehicle in accordance with one or more exemplary embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

In one or more exemplary embodiments described herein, the sensor fusion system 74 selects or otherwise identifies, for one or more cameras, a respective image from that camera that is temporally associated with a lidar scan based on a relationship between timestamps of the images captured by that camera and a sampling time when the lidar scan is aligned with the field of view of that camera. Thereafter, the sensor fusion system 74 correlates the image data from the selected image with the lidar point cloud data from when the lidar scan traverses the field of view of that camera to assign depths to the image data, identify objects in one or more of the image data and the lidar data, or otherwise synthesize the temporally associated image data and lidar data. In other words, the output provided by the sensor fusion system 74 reflects or is otherwise influenced by the temporal associations between camera images and lidar point cloud data.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
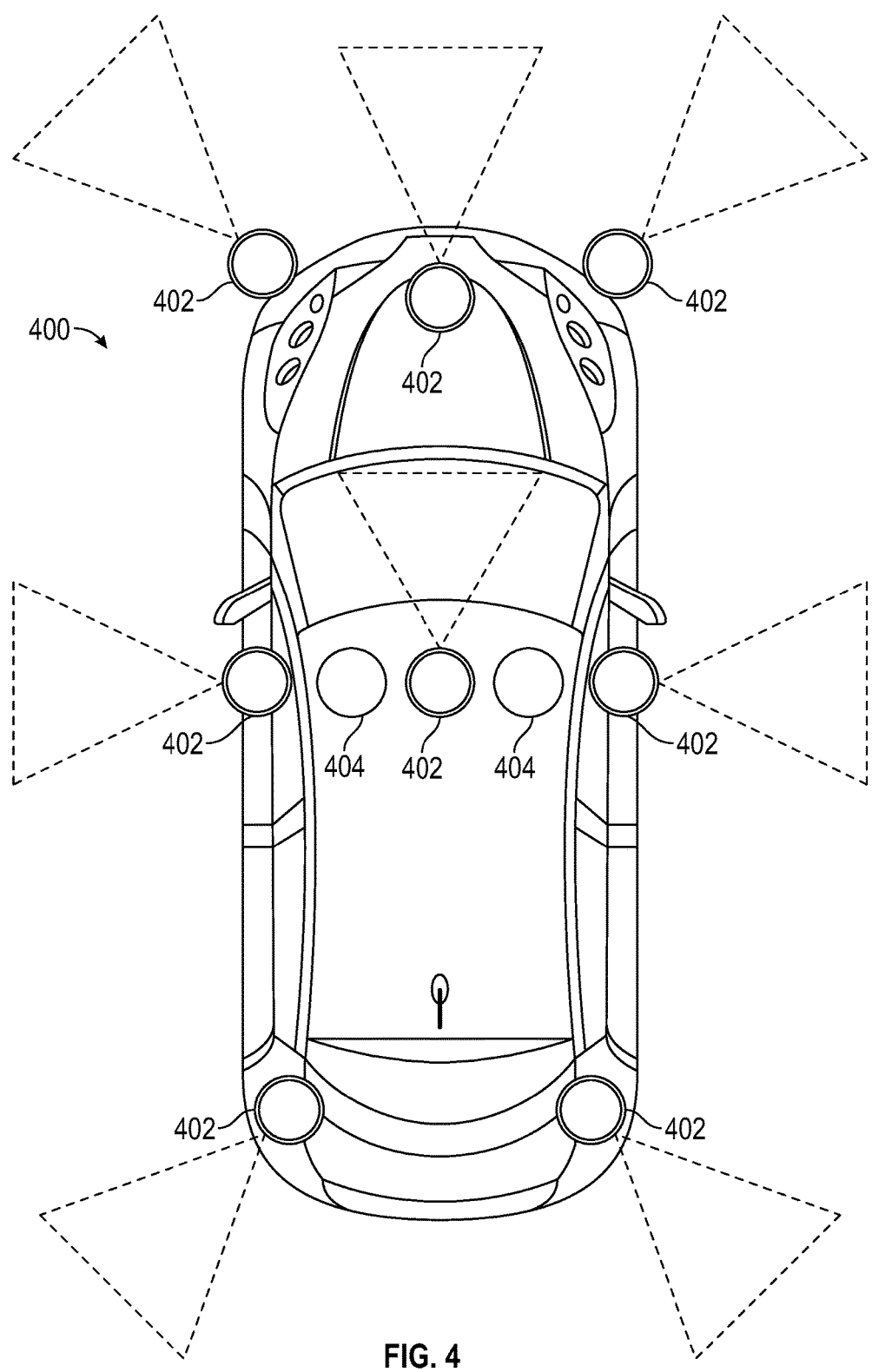
FIG. 4 is a block diagram of a vehicle depicting a plurality of imaging devices and a plurality of ranging devices onboard the vehicle in accordance with one or more exemplary embodiments.

FIG. 4 depicts an exemplary vehicle 400 that includes a plurality of cameras 402 distributed about the vehicle 400 and a plurality of ranging devices 404 distributed about the vehicle 400. The cameras 402 are disposed at different locations and oriented to provide different field of views that capture different portions of the surrounding environment in the vicinity of the vehicle 400. For example, a first camera 402 is positioned at the front left (or driver) side of the vehicle 400 and has its field of view oriented 45° counterclockwise relative to the longitudinal axis of the vehicle 400 in the forward direction, and another camera 402 may be positioned at the front right (or passenger) side of the vehicle 400 and has its field of view oriented 45° clockwise relative to the longitudinal axis of the vehicle 400. Additional cameras 402 are positioned at the rear left and right sides of the vehicle 400 and similarly oriented away from the longitudinal axis at 45° relative to the vehicle longitudinal axis, along with cameras 402 positioned on the left and right sides of the vehicle 400 and oriented away from the longitudinal axis perpendicular to the vehicle longitudinal axis. The illustrated embodiment also includes a pair of cameras 402 positioned at or near the vehicle longitudinal axis and oriented to capture a forward looking field of view along a line of sight substantially parallel to the vehicle longitudinal axis.

In exemplary embodiments, the cameras 402 have angle of views, focal lengths, and other attributes that are different from those of one or more other cameras 402. For example, the cameras 402 on the right and left sides of the vehicle may have an angle of view that is greater than the angle of view associated with the cameras 402 positioned at the front left, front right, rear left, or rear right of the vehicle. In some embodiments, the angle of view of the cameras 402 are chosen so that the field of view of different cameras 402 overlap, at least in part, to ensure camera coverage at particular locations or orientations relative to the vehicle 400.

The ranging devices 404 are also disposed at different locations of the vehicle 400, and in one embodiment, are disposed symmetrically about the longitudinal axis of the vehicle 400 to achieve parallax. In exemplary embodiments described herein, the ranging devices 404 are realized as lidar devices. In this regard, each of the ranging devices 404 may include or incorporate one or more lasers, scanning components, optical arrangements, photodetectors, and other components suitably configured to horizontally and rotatably scan the environment in the vicinity of the vehicle 400 with a particular angular frequency or rotational velocity. For example, in one embodiment, each lidar device 404 is configured to horizontally rotate and scan 360° at a frequency of 10 Hertz (Hz). As used herein, a lidar scan should be understood as referring to a single revolution of a lidar device 404.

In exemplary embodiments described herein, the cameras 402 autonomously and automatically captures images at a particular frequency, and the frequency or rate at which the cameras 402 capture images is greater than the angular frequency of the lidar devices 404. For example, in one embodiment, the cameras 402 capture new image data corresponding to their respective field of view at a rate of 30 Hz while the lidar device 404 scans and automatically provides updated data at a rate of 10 Hz. Thus, each camera 402 may capture multiple images per lidar scan, and capture the images at different times independent of the orientation of the lidar device 404 or the angular position within the scan. Accordingly, the subject matter described herein selects or otherwise identifies an image from each respective camera 402 that is temporally associated with the lidar point cloud data from a particular lidar scan based on the timestamps of the images captured by that respective camera 402 relative to a sampling time at which the angular position of the lidar scan corresponds to the line of sight of a lidar device 404 being aligned substantially parallel to the bisector (or line of sight) of the angle of view of the respective camera 402. In one embodiment, the frequency or sampling rate of the cameras 402 is at least twice the angular frequency of the lidar device 404.

Figure 5:
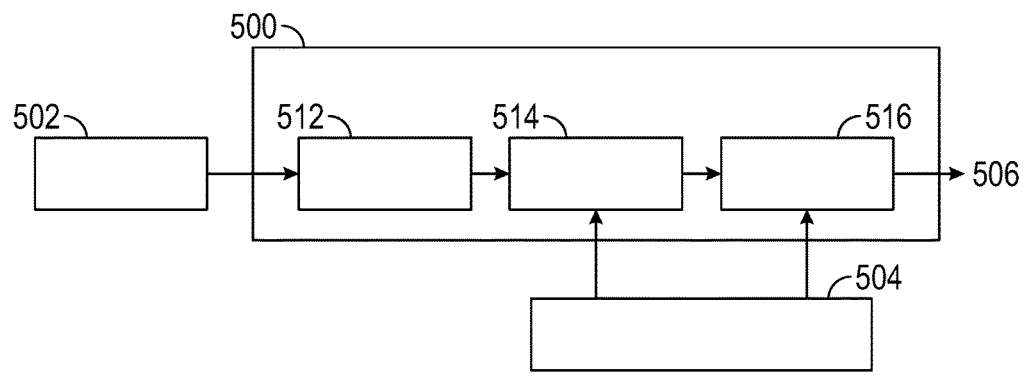
FIG. 5 is a block diagram of a processing module for implementation onboard the vehicle of FIG. 4 in accordance with one or more exemplary embodiments.

FIG. 5 depicts an embodiment of a processing module 500 (or control module) which may be implemented by or incorporated into the controller 34, the processor 44, and/or the sensor fusion system 74. The image processing module 500 is coupled to a camera 502 (e.g., one of cameras 402) onboard the vehicle and a lidar device 504 (e.g., one of lidar devices 404) onboard the vehicle. It should be noted that although FIG. 5 depicts a single camera 502, in practice, the image processing module 500 may be coupled to multiple cameras 40, 402 onboard a vehicle 10, 400 to temporally associate and correlate images from multiple cameras 40, 402 to the lidar point cloud data of an individual scan of the lidar device 504. Additionally, the image processing module 500 may be coupled to additional lidar devices 40, 504 onboard the vehicle 10, 400 to temporally associate and correlate different images from the onboard cameras 40, 402, 502 to the lidar point cloud data from scans of different lidar devices 40, 404, 504.

The image processing module 500 includes an image buffering module 512 which is configured to store or otherwise maintain image data corresponding to one or more images (or samples) captured by the camera 502. For example, an image sensor of the camera 502 may be sampled at a particular frequency (e.g., 30 Hz) to capture images of its field of view at that frequency, with the corresponding image data for a sample being stored or otherwise maintained by the image buffering module 512. In this regard, the image buffering module 512 may include a data storage element (or buffer) configured to store one or more image data sets from the camera 502. In one embodiment, the buffer is sized to store a number of image data sets corresponding to the number of images captured by the camera 502 per lidar scan. For example, for a lidar device 504 scanning at a frequency of 10 Hz and a camera 502 capturing images at a frequency of 30 Hz, the buffer of the image buffering module 512 may be capable of storing at least the 3 most recent images (or image data sets) captured by the camera 502. In exemplary embodiments, each image is stored or otherwise maintained in association with a timestamp that indicates the instance in time at which the image data was captured by the camera 502.

The image processing module 500 includes an image selection module 514 that is coupled to the image buffering module 512 and configured to select or otherwise identify the image in the buffer that is temporally associated with the lidar device 504 being aligned with the field of view of the camera 502 based on the timestamps associated with the images in the buffer. As described in greater detail below, in exemplary embodiments, the image selection module 514 is coupled to the lidar device 504 to receive a signal or indication of when the lidar device 504 is aligned at its starting or reference orientation within a scan, and then based on the angle or orientation of the bisector of the angle of view of the camera 502 and the angular frequency of the lidar device 504, the image selection module 514 calculates a sampling time at which the line of sight of the lidar device 504 is aligned parallel to the bisector of the angle of view of the camera 502, alternatively referred to herein as the lidar sampling time. Based on the sampling time, the image selection module 514 accesses the image buffering module 512 to retrieve or otherwise obtain the image data set having a timestamp that is closest to the lidar sampling time.

In the illustrated embodiment, the image selection module 514 provides the selected image that is temporally associated with the lidar scanning the field of view of the camera 502 to a data processing module 516. The data processing module 516 is coupled to the lidar device 504 to retrieve or otherwise obtain the lidar point cloud data from a lidar scan, and then correlates at least a portion of the lidar point cloud data to the temporally associated image data. For example, the data processing module 516 may select or otherwise identify the subset of the lidar point cloud data corresponding to the lidar device 504 traversing the angle of view of the camera 502, and then project the lidar point cloud data onto the selected image. In some embodiments, when correlating image data with point cloud data, the data processing module 516 also accounts for differences in location between where the lidar device 504 is located on the vehicle 10, 400 relative to the location where the camera 502 is located. In some embodiments, the data processing module 516 also utilizes the correlation between image data and point cloud data to detect objects for subsequent classification and prediction and provides such preprocessed output 506 (e.g., sensor output 335) to one or more additional object or obstacle analysis modules as described above.

Figure 6:
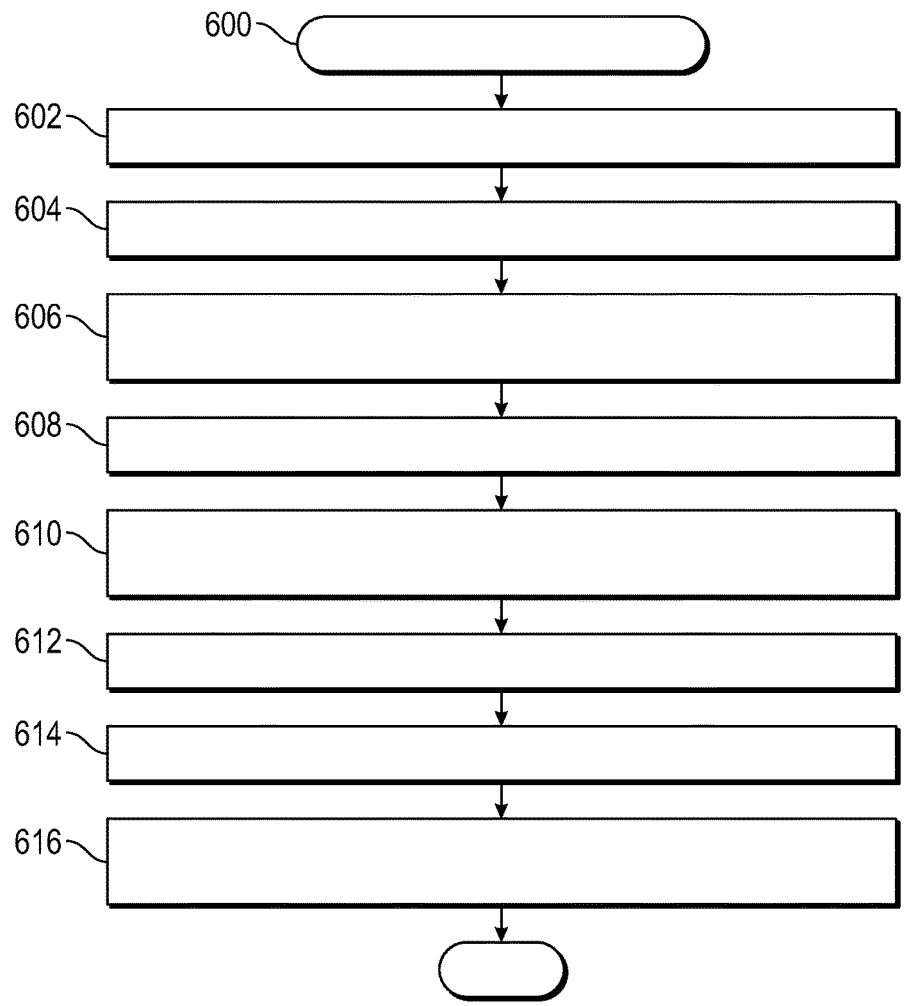
FIG. 6 is a flowchart illustrating a synchronization process for correlating data sets and influencing control of the autonomous vehicle of FIG. 1 in accordance with one or more exemplary embodiments.

Referring now to FIG. 6, and with continued reference to FIGS. 1-5, a dataflow diagram illustrates various embodiments of a synchronization process 600 which may be embedded within a controller 34 in the control system 100 of FIG. 1 supporting the ADS 70 and image processing module 500 of FIG. 5 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the synchronization process 600 can be scheduled to run based on one or more predetermined events, and/or can run continuously during operation of the autonomous vehicle 10.

The synchronization process 600 begins by identifying or otherwise obtaining lidar scan configuration data at 602. The lidar scan configuration data includes information characterizing or quantifying the initial or starting orientation of a lidar device relative to the longitudinal axis of the vehicle, an angular frequency associated with the lidar device, a direction of rotation of the lidar device, an indication of a start time for a lidar scan, and the like. For example, an onboard data storage element 32, 46 may store or otherwise maintain information characterizing the orientation from which an onboard lidar device starts a scan, the position or location of the lidar device on the vehicle, and the angular frequency associated with the lidar device. In some embodiments, one or more of the angular frequency, the direction of rotation, and/or the starting orientation may be dynamic or configurable under control of an onboard control module 34, 44. In exemplary embodiments, the lidar device is configured to generate or otherwise provide a signal or other indication when the lidar device is aligned with the starting orientation within a scan, thereby providing indication of a start time for a lidar scan.

The synchronization process 600 also identifies or otherwise obtains camera configuration data at 604. The camera configuration data includes information characterizing or quantifying the orientation of a line of sight of the camera or other imaging device relative to the longitudinal axis of the vehicle, an angle of view associated with the camera, a focal length of the camera, an update or refresh frequency of the camera, and the like. Similar to the lidar calibration data, for each camera or imaging device onboard the vehicle, an onboard data storage element 32, 46 may store or otherwise maintain information characterizing the camera orientation, the camera field of view, the position or location of the camera on the vehicle, and the frequency associated with the lidar device. In some embodiments, one or more of the update frequency, the focal length, or other aspects of the camera may be dynamic or configurable under control of an onboard control module 34, 44.

Based on the lidar scan configuration data and the camera configuration data, the synchronization process 600 calculates or otherwise determines an optimal sampling time for the camera that corresponds to alignment of the lidar line of sight with the camera field of view at 606. In this regard, based on the angular frequency of the lidar device, the synchronization process 600 calculates an expected amount of time required for the lidar device to rotate from its initial or starting location to an orientation where its line of sight is aligned with the bisector of the angle of view of the camera of interest, and then adds the resultant time period to the start time of the current lidar scan to arrive at an optimal sampling time for the camera being analyzed.

Figure 7:
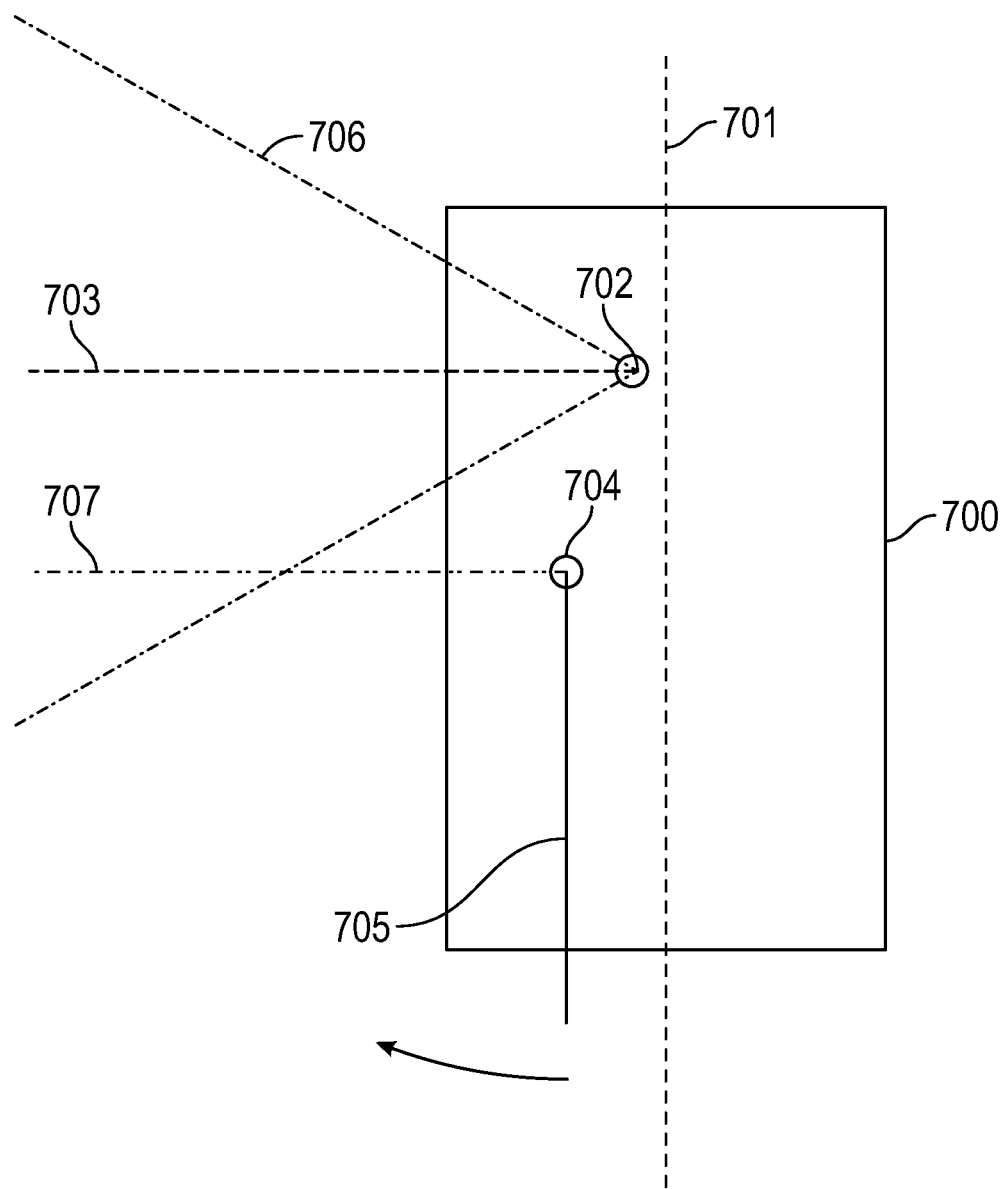
FIG. 7 is a block diagram of a vehicle including an onboard camera and an onboard lidar device suitably configured for implementing the synchronization process of FIG. 6 in accordance with one or more exemplary embodiments.

FIG. 7 illustrates an exemplary embodiment of a lidar device 704 and a camera 702 onboard a vehicle 700. In the illustrated embodiment, the initial reference orientation 705 (or starting orientation) of the lidar device 704 is aligned substantially parallel to the longitudinal axis 701 of the vehicle 700 and directed towards the rear of the vehicle 700, and the line of sight 703 of the camera 702 bisecting the camera angle of view 706 is substantially perpendicular to the vehicle longitudinal axis 701 and directed towards the left of the vehicle 700.

In exemplary embodiments, the lidar device 704 rotates counterclockwise, and therefore, does not reach a line of sight 707 aligned with the camera angle of view bisector 703 until a quarter revolution into a scan. Thus, the optimal sampling time may be calculated by adding an offset equal to one-fourth of the period of the lidar scan (the inverse of the angular frequency) to the lidar scan starting time when the lidar device 704 is aligned with the starting orientation 705. Alternatively, if the lidar device 704 were to rotate clockwise, a line of sight 707 aligned with the camera angle of view bisector 703 would be reached after three quarters of a revolution, in which case the optimal sampling time may be calculated by adding an offset equal to three-fourths of the period of the lidar scan to the lidar scan starting time. In one embodiment, the optimal sampling time ($t_c$) for a particular camera may be calculated by adding an offset to the scan starting time when the lidar device 704 is aligned at its reference orientation using the equation:

$$t_c = t_s + \frac{\alpha_c - \alpha_s}{f_s},$$

where $t_s$ is the starting time of the lidar scan, $\alpha_c$ is the angle of the camera line of sight, $\alpha_s$ is the starting angle for the lidar scan, and $f_s$ is the angular frequency of the lidar scan.

Referring again to FIG. 6 with continued reference to FIGS. 1-5 and 7, the synchronization process 600 stores, buffers, or otherwise maintains images from the camera at 608 and selects or otherwise identifies an image corresponding to the optimal sampling time corresponding to the lidar line of sight alignment based on the image timestamps at 610. For example, as described above in the context of FIG. 5, the image buffering module 512 may store or otherwise maintain images containing image data for the field of view 706 of the camera 502, 702 along with an associated timestamp indicative of when the images where captured (e.g., when the file containing the image data was created or instantiated). The image selection module 514 receives an indication of when the lidar device 504, 704 passes its orientation angle, and based on that start time for the lidar scan, calculates a sampling time when the lidar device 504, 704 is expected to reach an orientation aligned with the camera field of view 706 parallel to camera line of sight 703 at the orientation depicted by line of sight 707. The image selection module 514 analyzes the timestamps of the images maintained by the image buffering module 512 and selects or otherwise retrieves the image having the minimum difference between its timestamp and the calculated sampling time.

In exemplar embodiments, the synchronization process 600 associates or otherwise correlates the selected image with the lidar data captured at the sampling time for the camera field of view at 612. For example, as described above in the context of FIG. 5, the image selection module 514 may provide the selected image from the image buffering module 512 that is closest to the calculated lidar sampling time to the data processing module 516 for associations and correlations with the lidar data at the calculated sampling time. In one embodiment, the data processing module 516 selects the lidar data from the calculated sampling time for projection into the received image. Additionally, in one or more embodiments, based on the camera's angle of view 706 and the position of the camera 502, 702 relative to the lidar device 504, 704, the data processing module 516 may also select the lidar data obtained before and after the calculated sampling time to obtain a subset of lidar data that corresponds to the lidar device 504, 704 traversing the field of view 706. For example, the data processing module 516 may calculate or otherwise determine a first time prior to the calculated sampling time at which the lidar scan is likely to initially enter the camera field of view 706 and a second time after the calculated sampling time at which the lidar scan is likely to exit the camera field of view 706, and then select or otherwise obtain the lidar data corresponding to that portion of the lidar scan encompassing the camera field of view 706. The data processing module 516 may then project the subset of lidar data corresponding to the scan of the camera field of view 706 into the selected image, for example, to assign depths or three-dimensional characteristics, detect objects, and the like. By virtue of the selected image being the image that corresponds to the lidar scan, the accuracy and reliability of the projection is improved.

In one or more embodiments, the synchronization process 600 also deletes or otherwise discards other unselected images at 614. For example, after identifying the most temporally relevant image for analysis, the image selection module 514 may instruct or otherwise command the image buffering module 512 to remove or otherwise delete any other image data remaining in the buffer.

In one or more embodiments, to reduce latency, the image selection module 514 may notify the image buffering module 512 of the calculated start time, and in response, the image buffering module 512 automatically recognizes when the timestamp of a captured image is going to be the closest to the calculated lidar sampling time for that camera 502, 702 and pushes or otherwise provides the captured image to the image selection module 514 substantially in real-time. For example, based on the period at which the camera captures new images, the image buffering module 512 may determine in real-time whether the next image will be obtained closer in time to the calculated lidar sampling time. For example, for a camera capturing images at 30 Hz and updating images approximately every 33 milliseconds (ms), when the timestamp of a captured image precedes or follows the calculated lidar sampling time by 5 ms, the image buffering module 512 may automatically determine that the next image will not be closer in time to the calculated lidar sampling time and automatically provide the captured image to the image selection module 514 rather than waiting for the next image capture within the lidar scan. Conversely, if the timestamp of a captured image precedes the calculated lidar sampling time by 30 ms, the image buffering module 512 may automatically determine that the next image will likely be closer in time to the calculated lidar sampling time and wait for the next image to be captured and analyzed. In one embodiment, for a camera capturing images at 30 Hz, when a captured image precedes the calculated lidar sampling time by 17 ms or more, the image buffering module 512 may automatically determine that the next image will likely be closer in time to the calculated lidar sampling time and automatically discard the captured image.

Still referring to FIG. 6 with reference to FIGS. 1-5, as described above, at 616, the synchronization process 600 generates or otherwise determines commands for operating onboard actuators and autonomously controlling the vehicle based at least in part on the correlation between image data and lidar data. For example, the correlation may be utilized to classify objects and assign depths or distances to the objects, which may be further utilized to predict the object's future behavior. Based on the type of object and the current distance of the object from the vehicle and the predicted object behavior, the controller 34 and/or processor 44 may calculate or otherwise determine a route for autonomously operating the vehicle 10 and corresponding actuator commands for controlling the lateral or longitudinal movement of the vehicle along the route in a manner that avoids any collisions or conflicts with the object and adheres to any applicable safety buffers, minimum following distances, minimum separation distances, and the like for the particular type of object.

It will be appreciated that the subject matter described herein allows for an improved temporal association between data captured by different devices sampling a common region at different instances in time, thereby improving the accuracy and reliability of correlations performed across data sets. At the same time, the temporal association of data sets is achieved without reliance on complex triggering mechanisms and allows the different devices to operate autonomously at their own respective update rates or frequencies independent of other onboard devices and without interruption. Thus, the various devices may be configured to achieve desired performance characteristics without compromising aspects for the purpose of synchronization (e.g., by dedicating resources to interrupt monitoring or handling). While the subject matter is described herein primarily in the context of correlating an automatically captured camera image to lidar scanning independently of the camera and vice versa, the subject matter is not necessarily to cameras or lidar and could be used in the context of any other pair or combination of devices of different imaging or surveying types to establish correlations between data sets from different devices operating independently of one another.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
   obtaining, by a controller onboard the vehicle from a ranging device onboard the vehicle, ranging data corresponding to a field of view of a camera onboard the vehicle, the ranging device scanning an environment around the vehicle at a first frequency;
   selecting, by the controller, an image from a plurality of images captured by the camera based on a relationship between a timestamp associated with the image and the first frequency associated with the ranging device, wherein the plurality of images are captured at a second frequency different from the first frequency;
   correlating, by the controller, the image and the ranging data; and
   determining, by the controller, a command for operating one or more actuators onboard the vehicle in a manner that is influenced by the correlation between the image and the ranging data.

2. The method of claim 1, wherein:
   correlating the image and the ranging data comprises assigning depths to the image based on the ranging data; and
   determining the command comprises determining a route for the vehicle in a manner that is influenced by the depths assigned to the image.

3. The method of claim 1, further comprising:
   obtaining, by the controller, first configuration data associated with the camera;
   obtaining, by the controller, second configuration data associated with the ranging device; and
   calculating, by the controller, a sampling time associated with the ranging device based at least in part on a relationship between the first configuration data and the second configuration data and the frequency of the ranging device, wherein selecting the image comprises selecting the image based on a difference between the timestamp associated with the image and the sampling time.

4. The method of claim 3, wherein calculating the sampling time comprises determining the sampling time when a line of sight associated with the ranging device is aligned with a line of sight associated with the camera.

5. The method of claim 1, wherein determining the command comprises determining a route for autonomously operating the vehicle based at least in part on an object in the region in a manner that is influenced by the correlation between the image and the ranging data.

6. A vehicle, comprising:
   a camera onboard the vehicle capturing a plurality of images of a field of view at a first frequency;
   a ranging device onboard the vehicle scanning an environment around the vehicle at a second frequency different from the first frequency to obtain ranging data;
   one or more actuators onboard the vehicle; and
   a controller that, by a processor, selects an image of the plurality of images based on a relationship between a timestamp associated with the image and the second frequency associated with the second device, correlates the image with a subset of the ranging data corresponding to the field of view, and autonomously operates the one or more actuators onboard the vehicle in a manner that is influenced by the correlation between the image and the subset of ranging data.

7. The vehicle of claim 6, further comprising a data storage element to maintain first calibration data associated with the camera and second calibration data associated with the ranging device, wherein the controller is coupled to the data storage element to:
   determine a sampling time corresponding to alignment of the ranging device with the field of view based at least in part on the second frequency and a relationship between the first calibration data and the second calibration data; and
   select the image of the plurality of images based on a difference between the timestamp of the first image and the sampling time.

8. The vehicle of claim 7, wherein the controller identifies the subset of the ranging data based on the sampling time.

9. The vehicle of claim 7, the second calibration data indicating a reference orientation for the ranging device scanning the environment, wherein the controller receives an indication from the ranging device in response to the ranging device traversing the reference orientation and calculates the sampling time based on a scan start time associated with the indication and an orientation of the field of view relative to the reference orientation.

10. The vehicle of claim 6, wherein the first frequency is greater than the second frequency.

11. A method of controlling a vehicle, the method comprising:
   obtaining, by a control module onboard the vehicle, a plurality of images from a camera onboard the vehicle, the camera capturing the plurality of images of a field of view at a first frequency;
   obtaining, by the control module, ranging data from a ranging device onboard the vehicle, the ranging device scanning an environment around the vehicle at a second frequency different from the first frequency;
   correlating, by the control module, a first image of the plurality of images with a subset of the ranging data corresponding to the field of view based on a relationship between a timestamp associated with the first image and the second frequency;

determining, by the control module, a command for operating one or more actuators onboard the vehicle in a manner that is influenced by the correlation between the first image and the subset of the ranging data; and autonomously operating, by the control module, the one or more actuators in accordance with the command.

12. The method of claim 11, further comprising:

determining, by the control module, a sampling time corresponding to alignment of a line of sight of the ranging device with the field of view; and selecting, by the control module, the first image from among the plurality of images based on a difference between the timestamp and the sampling time.

13. The method of claim 12, further comprising:

obtaining, by the control module, a starting orientation for the scanning of the environment by the ranging device; and obtaining, by the control module, an orientation for the field of view of the camera, wherein determining the sampling time comprises calculating the sampling time based on a difference between the starting orientation and the orientation for the field of view.

14. The method of claim 13, further comprising receiving, by the control module, an indication from the ranging device at a scan start time in response to the ranging device traversing the reference orientation, wherein calculating the sampling time comprises:

calculating an offset based on the difference and the second frequency; and adding the offset to the scan start time to obtain the sampling time.

15. The method of claim 11, wherein correlating comprises the assigning depths to the first image based on the subset.

16. The method of claim 11, wherein correlating comprises identifying a portion of the subset corresponding to an object based on the first image.

17. The method of claim 16, further comprising classifying the object as an object type based on the portion of the subset of the ranging data, wherein the determining the command comprises determining the command in a manner that is influenced by the object type.

* * * * *